Nov. 30, 1937.  F. E. RUNGE  2,100,751
RECORD MOVING MECHANISM
Filed Nov. 12, 1935
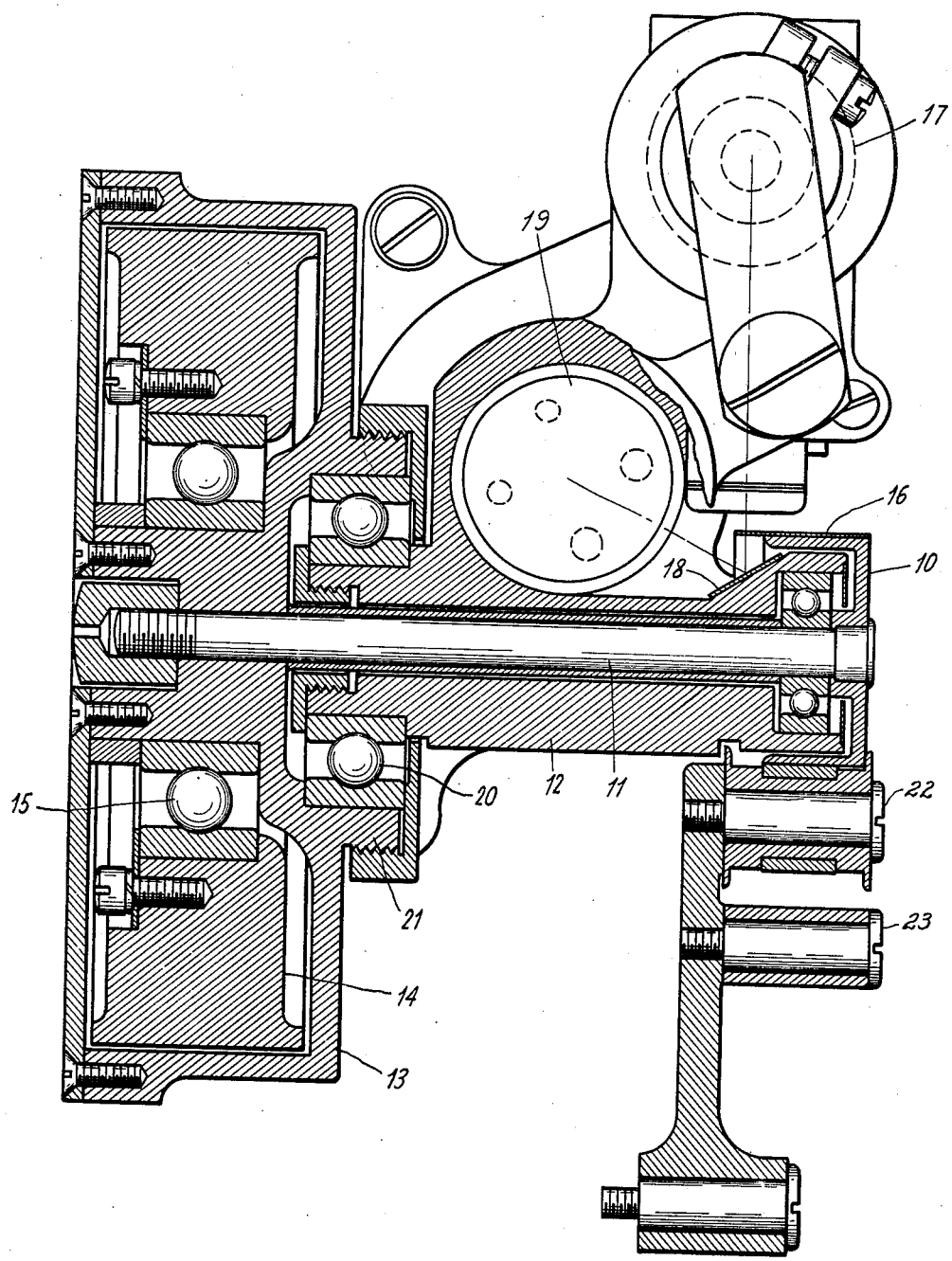
INVENTOR
FRANK E. RUNGE
BY
ATTORNEY Patented Nov. 30, 1937

2,100,751

UNITED STATES PATENT OFFICE 2,100,751

RECORD MOVING MECHANISM

Frank E. Runge, Oaklyn, N. J., assignor to Radio Corporation of America, a corporation of Delaware Application November 12, 1935, Serial No. 49,342

3 Claims. (Cl. 271—2.3)

This invention relates to record moving mechanisms such as those utilized in connection with sound recorders and reproducers of the film or disk type, and has for its principal object the provision of an improved apparatus and method of operation whereby the speed of said records is maintained substantially constant, irrespective of the irregularities in the driving torque of the apparatus.

The present invention is in some respects an improvement on that disclosed by an Elwood W. Reynolds Patent No. 2,013,109, which is assigned to the same assignee as the present application, and discloses a film drive mechanism wherein (1) a sound record film is fed to and from a sound take-off drum in the form of a loop which isolates the film at the take-off point from speed irregularities otherwise transmitted to it through the film, (2) the drum together with its associated apparatus is driven by the elasticity of the film, and (3) the speed irregularities which tend to be produced by variation in the stiffness of the film and the like are obviated by the resistance of a viscous fluid interposed between a light casing mechanically coupled to and rotatable from the sound take-off drum and a freely rotatable damping wheel mounted within this casing.

In the manufacture of this drive mechanism, it has heretofore been customary to provide it with a bearing or bearings interposed between the sound take-off drum mounted at one end of the shaft and the casing of the freely rotatable damping wheel mounted at the opposite end of the shaft. This construction has been preferred for the reason that it avoids the use of a fluid bushing between the shaft and casing or the use of bearings at opposite sides of the casing in which the damping wheel is mounted.

It has been found, however, that the shaft is likely to be bent out of alignment when the wheel is supported at its end, thus resulting in the introduction of irregularities in the speed of the record. For this reason it has been customary to remove the wheel and casing from the shaft prior to shipping of the apparatus and to replace these parts on the shaft when the apparatus is installed. In accordance with this invention, these difficulties are avoided by so mounting the freely rotatable wheel and its casing that they are largely supported independently of the shaft through which the casing is rotated by means of the elasticity of the film record.

The invention will be better understood from the following description when considered in connection with the accompanying drawing, and its scope will be pointed out in the appended claims.

The single figure of the drawing illustrates a form of the invention in which the casing and wheel are rotatably supported on the periphery of the bearing of the driving shaft.

This form of the apparatus includes a film drum 10 which is fixed to one end of a shaft 11 rotatably mounted within a bearing support 12 and fixed at its opposite end to a light casing 13 of magnesium or the like within which a damping wheel 14 is freely rotatable on ball bearings 15. Within the casing 13, and coupling it to the damping wheel 14, there is provided a viscous fluid such, for example, as oil. A film 16 is fed to and from the sound take-off drum 10 by means of suitable sprockets (not shown) in such manner that a film loop is formed at each side of the drum and the drum is driven due to the elastic force stored in the film loop. The lower loop, which pulls the film down is formed by the flatwise elasticity of the film flexed around the idler rollers 22 and 23, as in the Reynolds patent referred to above.

Light from an exciter lamp 17 is transmitted through the overhung edge of the record 16 to a recorder mirror 18 from which it is reflected to a photocell or other light responsive device 19 which controls the input potential of an amplifier in a manner which forms no part of applicant's invention and will be readily understood without further explanation.

As previously indicated, the damping wheel 14 is freely rotatable within the casing 13 on the roller bearing 15. As heretofore constructed, this assembly was supported at the end of the shaft 11 to which the casing is fixed and its weight tended to bend the shaft 11 out of alignment with its rotational axis. In the construction of the present invention, this objectionable result is avoided by the provision of a roller bearing 20 interposed between the outer periphery of the bearing member 12 and the inner periphery of an extension 21 of the casing 13. With this construction the casing and damping wheel are supported independently of the shaft 11, bending of this shaft is avoided and a high degree of uniformity in the speed of the record 16 is realized.

I claim:

1. Phonographic apparatus including a bearing support, a shaft mounted in said bearing support on ball bearings, a rotatable record support mounted on said shaft, a rotatable casing fixed to said shaft and mounted on ball bearings on said bearing support independently of said shaft and a damping wheel rotatably supported within and by said casing.

2. Phonographic apparatus including a bearing support, a shaft mounted in said bearing support on ball bearings, a rotatable record support mounted on said shaft, a rotatable casing fixed to said shaft and mounted on ball bearings on said bearing support independently of said shaft, a damping wheel rotatably supported within and by said casing and a viscous fluid coupling said damping wheel and said casing.

3. Phonographic apparatus including a bearing support, a shaft mounted in said bearing support on ball bearings, a rotatable record support mounted on said shaft, a rotatable casing fixed to said shaft and mounted on ball bearings externally of said bearing support and independently of said shaft, a damping wheel rotatably supported within and by said casing, and a viscous fluid coupling said damping wheel and said casing.

FRANK E. RUNGE.